UNITED STATES PATENT OFFICE.

JOSEPH J. BARTLETT, OF NEW YORK, N. Y.

IMPROVEMENT IN COMPOSITIONS FOR FORMING STONE, &c.

Specification forming part of Letters Patent No. 134,628, dated January 7, 1873.

*To all whom it may concern:*

Be it known that I, JOSEPH J. BARTLETT, of the city, county, and State of New York, have invented a new and Improved Compound for Building and other Purposes; and I do hereby declare the following to be a full, clear, and exact description thereof which will enable those skilled in the art to make and use the same.

This invention relates to a compound produced by treating asbestus, either ground or in fibers, first with silicate of potash or soda, then pressing the same into molds of any desired form or shape, and finally saturating the mass with chloride of calcium, either pure or mixed with chloride of magnesium, and then washing it in pure water in such a manner that a fire-proof compound is obtained which is impervious to water, and which can be used with great advantage for many different purposes.

In carrying out my invention, I take asbestus and grind the same or reduce it to fibers by any suitable means, and these fibers I mix with a sufficient quantity of silicate of potash or soda in solution to produce a plastic mass. This mass I press into molds, or I bring the same in the required form by any suitable means, and after it has been formed and set I saturate it with a solution of chloride of calcium, either pure or mixed with chloride of magnesium, using, by preference, the bittern or mother water from salt-works. By the action of the chloride of calcium and magnesium the alkaline silicate previously mixed with the asbestus is decomposed, forming insoluble silicates of lime and magnesia and soluble chlorides of potassium or sodium, which latter are readily removed by washing the mass with clear water.

By these means I produce a compound of asbestus with silicates of lime and magnesia which is fire-proof and insoluble in water; and since this compound, before being treated with the chlorides of calcium and magnesium, can be molded into any desired article, I am enabled to use my compound with great advantage for general building purposes, such as roofing, exterior and interior covering for walls, floors, and ceilings; for moldings, architraves, and decorations; for refrigerators, wine-cellars, filling of fire-proof safes and vaults; for ocean steamers, for steamboats, and ships; for portable houses and villas; for factories, station and frame houses; for barracks, interiors of forts, and officers' quarters within fortifications; for powder-magazines, and buildings to cover army and navy supplies of all kinds.

The principal advantage of my compound is that the same preserves a certain degree of elasticity, which is mainly due to the fibrous nature of asbestus, and which cannot be attained if, in place of asbestus, clay or other material of a similar nature is used.

My compound can also be spread on paper or on metal or wood to serve as a protective coat.

What I claim as new, and desire to secure by Letters Patent, is—

1. A compound obtained by treating asbestus, substantially in the manner herein described.

2. The within-described process of treating asbestus, substantially as and for the purposes set forth.

JOS. J. BARTLETT.

Witnesses:
  W. HAUFF,
  J. G. HALEY.